United States Patent [19]
Bartel

[11] Patent Number: 6,142,496
[45] Date of Patent: Nov. 7, 2000

[54] LOW LOAD FLOOR TRAILER AND SUSPENSION SYSTEM

[75] Inventor: James J. Bartel, Commerce Township, Mich.

[73] Assignee: Arboc Ltd., Commerce Township, Mich.

[21] Appl. No.: 09/267,838

[22] Filed: Mar. 12, 1999

[51] Int. Cl.[7] ............................. B60G 7/00; B60G 11/18; B60J 7/00

[52] U.S. Cl. .................................. 280/124.166; 280/789; 280/124.128; 280/6.159; 280/788; 296/181; 296/273

[58] Field of Search ................................ 280/789, 124.1, 280/124.128, 6.15, 6.157, 6.159, 6.16, 788, 781, 6.151, 124.166, FOR 178, FOR 180, 124.158; 296/181; 267/154, 273, 274, 283, 284, 285

[56] References Cited

U.S. PATENT DOCUMENTS

| | | | |
|---|---|---|---|
| 2,151,633 | 3/1939 | Black | 280/788 |
| 2,957,593 | 10/1960 | Evans | 280/43.23 |
| 3,633,775 | 1/1972 | Pugliese | 280/43.23 |
| 3,787,073 | 1/1974 | Lievore | 280/124 A |
| 3,866,935 | 2/1975 | Nelson | 280/43.23 |
| 3,951,225 | 4/1976 | Schwenk | 180/73 R |
| 4,220,349 | 9/1980 | Gaussin | 280/788 |
| 4,260,315 | 4/1981 | Bouffard | 414/469 |
| 4,453,735 | 6/1984 | Penverne et al. | 280/690 |
| 4,568,094 | 2/1986 | Lovell | 280/789 |
| 4,723,790 | 2/1988 | Wharton | 280/124.166 |
| 4,878,691 | 11/1989 | Cooper et al. | 280/189 |
| 4,934,733 | 6/1990 | Smith et al. | 280/711 |
| 4,946,333 | 8/1990 | Boatwright | 414/559 |
| 5,016,912 | 5/1991 | Smith et al. | 280/711 |
| 5,215,329 | 6/1993 | Santo | 280/723 |
| 5,275,430 | 1/1994 | Smith | 280/6.151 |

FOREIGN PATENT DOCUMENTS

| | | | |
|---|---|---|---|
| 464 412 | 1/1992 | European Pat. Off. | 280/713 |
| 392284 | 9/1965 | Switzerland | 296/181 |
| 93/11953 | 6/1993 | WIPO | 280/711 |

*Primary Examiner*—Brian L. Johnson
*Assistant Examiner*—Matthew Luby
*Attorney, Agent, or Firm*—Harness, Dickey & Pierce, P.L.C.

[57] ABSTRACT

A towable trailer has a load floor supported by air springs on a torsion box suspension system. The load floor consists of a plurality of preformed panels comprised of a plate section and a plurality of I beam members. Adjacent panels are interconnected with a tab and slot structure and then secured as a unit by a pair of angle beam side rails. The suspension system includes a pair of spaced parallel transverse beams extending between and secured to a pair of trailing arms which are pivotally mounted on brace members secured to the underside of the load floor and the front of the trailer. A pair of plates are secured to respective ends of the transverse beams adjacent the trailing arms. Cross beam members are positioned between and secured to the plates and the transverse beams. The trailer wheel are supported on wheel support arms which are secured to and extend upwardly from each trailing arm to position the center of each wheel above the load floor of the trailer. The angle beam side rails are connected with a vertically spaced top beam by fore and aft vertical beams and a side skin.

5 Claims, 3 Drawing Sheets

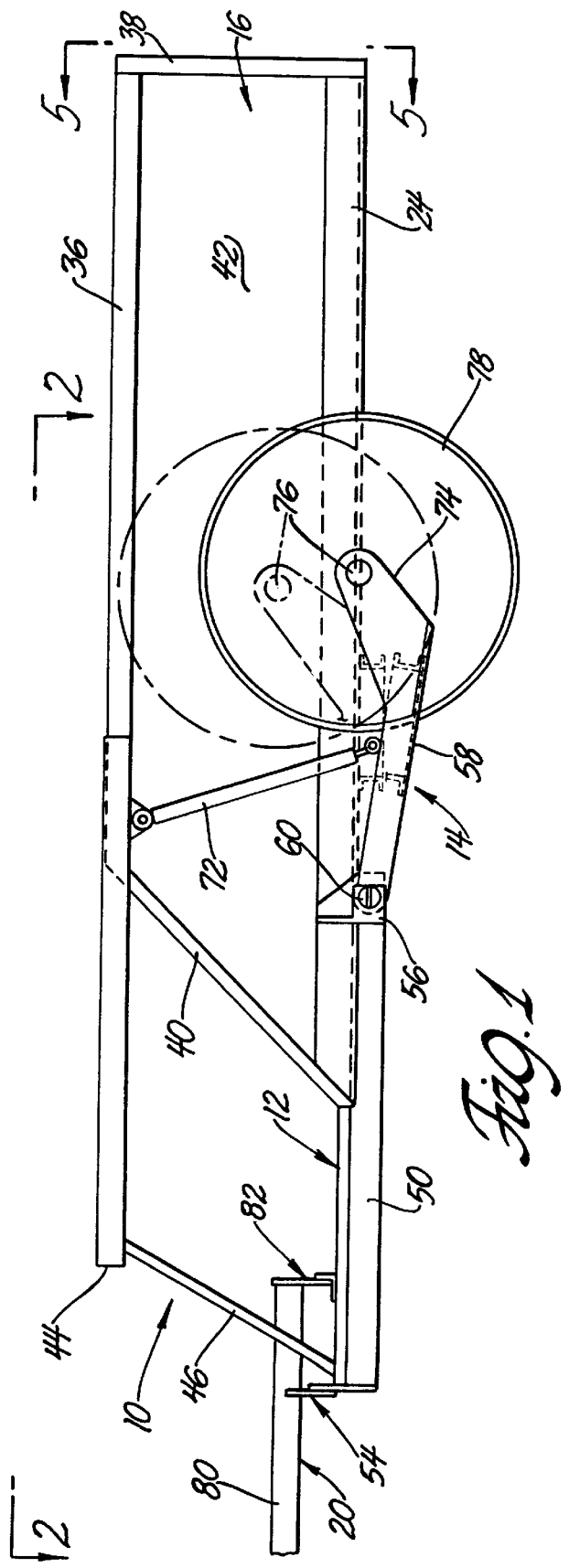
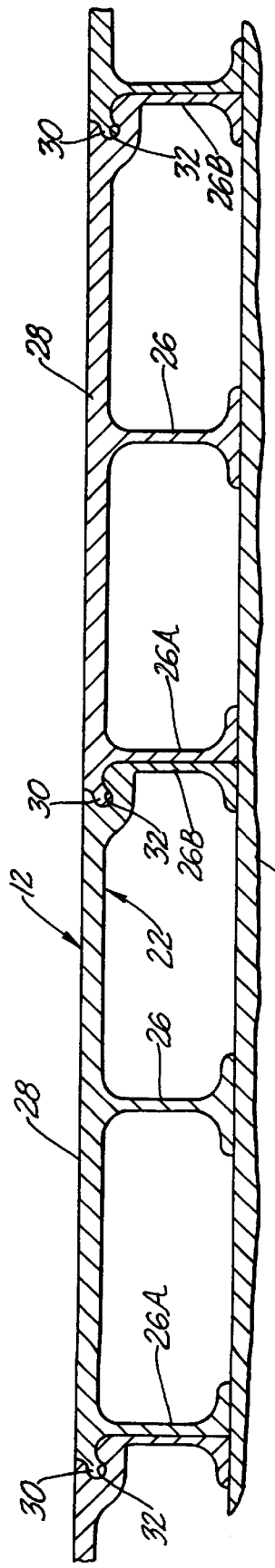

LOW LOAD FLOOR TRAILER AND SUSPENSION SYSTEM

TECHNICAL FIELD

This invention relates to vehicle towed trailers and more particularly to trailers having a low load floor and trailing arm suspension system.

BACKGROUND OF THE INVENTION

Vehicle towed trailers have a rigid axle on which the wheels are rotatably supported. The axle is disposed beneath the load floor of the trailer. The body of the trailer is supported above the axle by leaf springs. Two or more shock absorbers are employed between the axle and the trailer floor to dampen the road vibrations. Depending on the load to be transported on the trailer, the wheel will have a rolling radius between twelve and twenty-two inches. This will position the trailer floor approximately eighteen to thirty inches above the ground.

The trailer generally has a tiltable bed portion which will permit the rear of the trailer to be positioned near or in abutment with the ground. Components, such as snow mobiles and all terrain vehicles, which are to be loaded are then driven or winched onto the tilted trailer bed. Care must be taken by the operator during loading to ensure that the trailer bed is not returned to the flat position too rapidly. Also the tilting structure adds cost and manufacturing complexity to the trailer as well as a hazard if the locking mechanism of the tilt structure is not properly employed.

When the trailer does not have a tiltable body portion, additional ramps are utilized to assist in loading the components onto the trailer. The ramps must be stored on the trailer during towing so that they will be available for unloading the components. Alternatively, the trailer can be detached from the towing vehicle and tilted at the rear axle to facilitate loading. However, the angle at which the trailer must be tilted is quite large which makes the loading of heavy items very difficult and hazardous.

Low load floor trailers have been proposed for use with semi-trailer. These trailers have multiple wheel on each side of the which are independently suspended and the trailer does not lend itself to tilting. The suspension systems of these trailers do not have a cross tie member such that provisions must be made at each wheel for absorbing transverse loading of the wheel. One prior art suspension system employs spaced guide pads between which a portion of the trailing arm is disposed for each wheel. Another of these structures incorporates an arm which is pivotally mounted between the trailing arm of the wheel and a central point on the frame. These suspension systems do not allow trailer loading without the use of loading ramps or having the trailer parked at a loading dock.

SUMMARY OF THE INVENTION

It is an object of the present invention to provide an improved load floor trailer and a trailer suspension system.

In one aspect of the present invention, a trailer has a flat load floor, upright side walls and a pair of trailing arms pivotally suspended outboard of the side wall. In another aspect of the present invention, the trailing arms are part of a modular suspension system and are pivotally mounted on frame members of the suspension module that are secured to the bottom of the trailer floor.

In yet another aspect of the present invention, the trailing arms each have a wheel support member secured thereto and extending upwardly from the trailing arm. In still another aspect of the present invention, the trailing arms are interconnected laterally by a torsion box having side beams secured to the trailing arms. In yet still another aspect of the present invention, a pair of spaced flat plates are secured across the side beams adjacent respective ones of the trailing arms and cross-beam members are secured to the side beams and the flat plates.

In a further aspect of the present invention, the trailer has longitudinal lower side beams adjacent the floor and upper side beams with a skin wall interconnecting the upper and lower side beams. In a yet further aspect of the present invention, a pair of spaced air springs are disposed between the torsion box and the trailer floor.

BRIEF DESCRIPTION OF THE DRAWINGS

Further objects, features and advantages of the present invention will become apparent from analysis of the following written specification and accompanying drawings and the appended claims in which:

FIG. 1 is a side elevational view of a trailer incorporating the present invention.

FIG. 4 is a view taken along line 4—4 in FIG. 2.

DESCRIPTION OF AN EXEMPLARY EMBODIMENT

Figure 5:
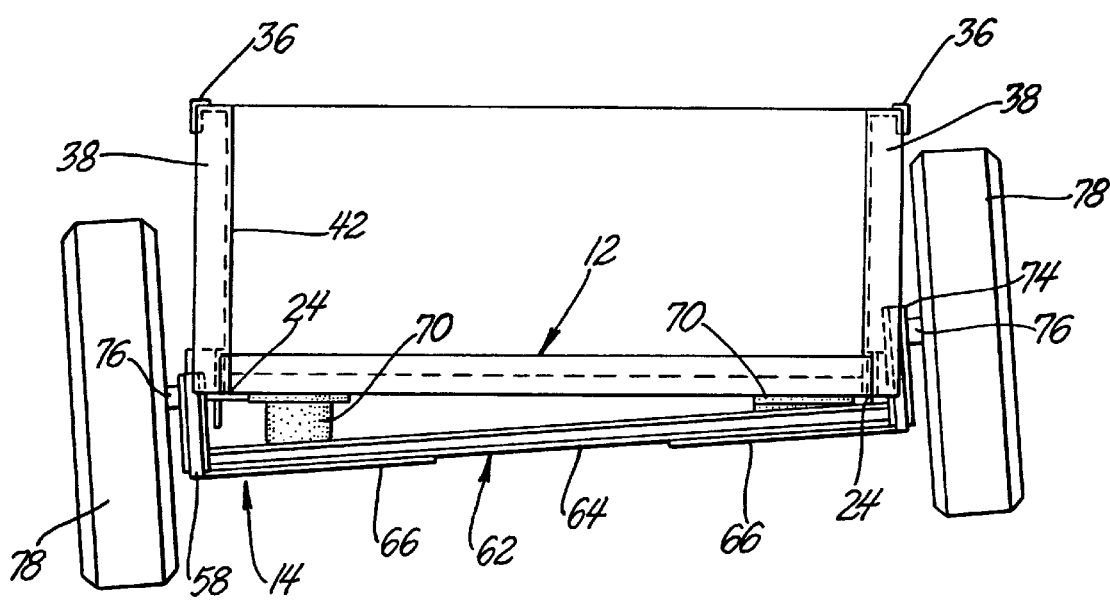
FIG. 5 is a rear view of the trailer.

Referring to the drawings wherein like characters represent the same or corresponding components there is seen a trailer 10 having a load floor 12, a suspension system 14, side walls 16, and a trailer hitch 20. The load floor, as best seen in FIGS. 4 and 5, includes a plurality of transverse platforms 22 secured together by angle side beams 24 which extend longitudinally of the trailer load floor 12. These beams 24 support longitudinal rigidity and strength to the load floor 12 The platforms 22 each have a plurality of I beam members 26 joined by a plate section 28. A tab 30 extends form the plate section 28 adjacent the I beam 26A and slot 32 is formed in the plate section 28 adjacent the I beam 26B. While each platform 22 is shown as having three I beams 26, it is possible to provide wider platforms with more than three I beams. If one chooses, the I beams 26 can be enclosed, and the load floor further enhanced, by securing a thin skin 34 to the bottom of the I beams 26. Alternatively, or in addition, in some instances one may prefer to weld the lower facing edges of I beams 26A and 26B together to further enhance longitudinal strength of the load floor.

The platforms 22 are extruded components which are commercially available with various length, width and thickness dimensions. The length dimension is substantially equal to the width of the trailer. The thickness of the platform will depend on the load that the trailer is designed to accommodate. This load floor structure provides the benefit of a thin floor which is beneficial to a load floor trailer.

Figure 2:
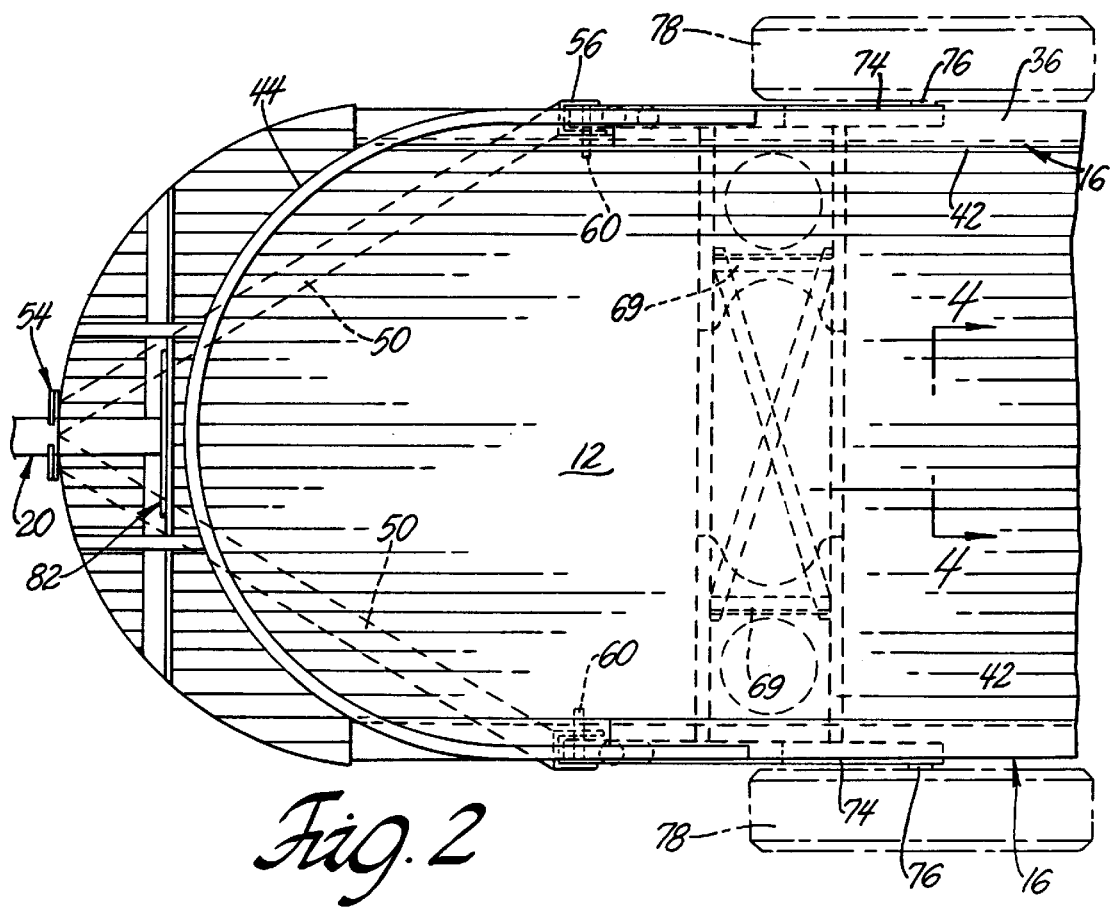
FIG. 2 is a partial top view of the trailer taken along line 2—2 in FIG. 1.

As best seen in FIGS. 1, 2 and 5, each side wall 16 has a top beam 36, a vertical support 38, an angularly disposed support 40 and a side skin 42. The side skin 42 is secured to one angle beam 24, the top beam 36, the vertical support 38 and the support 40. The beams 24 serve to secure the side wall 16 with the load floor 12. The side walls 16 also have a curved extension 44 secured to the respective top beams 36. The extension 44 is supported by a pair of front angularly disposed support beam 46, 48. A front skin, not shown, can be attached between the curved extension 44 and the load floor 12. This addition permits the front of the trailer to be closed.

Longitudinal strength can be imparted to the trailer through side beams on the lateral edges of the load floor and/or by means of the sidewalls. In the drawing, side beams 24 on the bottom of the sidewalls are secured to the side edges of the trailer floor. In this connection, the sidewalls themselves can be load-bearing structures that provide longitudinal support. In addition, or alternatively, the sidewalls can be flanged at their tops, or rolled, for added longitudinal reinforcement. Lateral stability of the trailer sidewalls can be imparted in a variety of ways. In addition to merely having a flat front end wall such as is characteristic of conventional cargo trailers, one might choose the rounded front extension 44 support shown in the drawing. In some instances, one might not want to employ a front end lateral support for the sidewalls. One or more permanent or removable bars, connecting the tops of the sidewalls, could reinforce the sidewalls. Alternatively one might choose to employ an external support to give the sidewalls added lateral stability, as for example a flying buttress type of support. Also if there is an overhang of the front end of the trailer floor from the sidewalls, as shown in the drawing, additional bracing beneath the load floor can be employed, such as the convergent braces 50. Accordingly, the type of curved front end and associated front skin (not shown) on the trailer shown in the, is just one configuration possible for the trailer. The structural load floor and longitudinal sidewall supports permit the front wall, or body, portion of the trailer to be non-load bearing. The front end wall of the trailer can thus be specially shaped for any particular application. This can range from square-cornered for maximum internal volume to compound curves for aerodynamic or styling purposes. If the load floor is adequately reinforced at its edges, the compound curvature of the trailer front end can even extend into the sidewalls as well. Hence, maximum styling freedom is possible.

Figure 3:
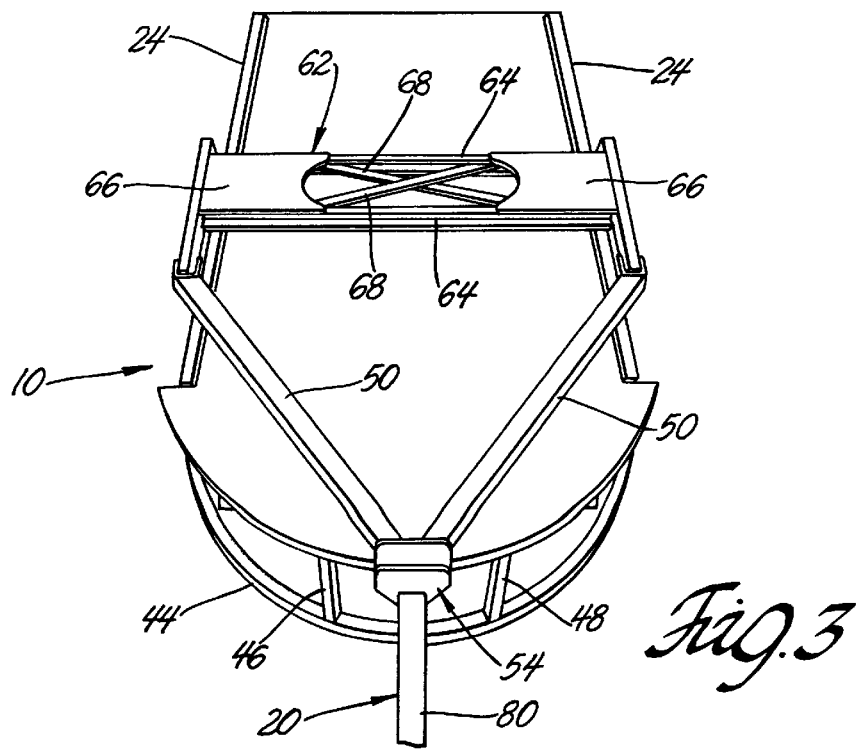
FIG. 3 is a perspective view of the bottom of the trailer shown is FIG. 1.

As best seen in FIGS. 1,2 and 3, a pair of braces 50, are secured to the underside of the load floor 12 between respective ones of the angle side beams 24 and a bracket 54 which is secured to the front of the load floor 12. The bracket 54 permits the braces 50, which are converging frame members, share the towing load, imposed on the hitch 20, with the load floor 12. Each brace 50 has a bracket 56 secured thereto which pivotally supports the forward end of a trailing arm 58 on a pin 60. The trailing arms 58 are components of the modular suspension system 14. The braces 50 extend forwardly of the side beams 24 to also provide longitudinal and torsional rigidity to the load floor 12 at the forward end of the trailer.

The trailing arms 58 of the suspension system 14 are interconnected by a torsion box 62 comprised of a pair of transverse beams 64, a pair of plates 66 and a pair of cross members 68. The transverse beams 64 are welded or otherwise secured to the trailing arms 58 and the plates 66 are secured along the transverse beams 64 at opposite ends thereof. The plates 66 add transverse rigidity to the torsion box 62 while the transverse beams 64 permit torsional flexibility along the length of the torsion box 62.

The cross members 68 add lateral rigidity to the central portion of the torsion box 62. The cross members 68 are also secured to beams 69 which extend between the transverse beams 64. These beams also provide additional support for the plates 66 to insure a suspension system that is rigid transversely and longitudinally relative to the load floor 12. As will be noted later, the transverse beams will permit a degree of independent wheel action to the trailer suspension system 14.

The torsion box 62 and trailing arms 58 are urged to pivot about the pins 60 by a pair of air springs 70 which are disposed between respective plates 58 and the load floor 12 as best seen in FIG. 5. This urges the trailer load floor 12 upward from the torsion box 62 to a substantially level position. The air pressure in the air springs can be controlled to insure that the trailer load floor 12 is level when the trailer 10 is on level ground. The air springs 70 are conventional devices and as such may be simple air bags or an air bag plus a helical compression spring, not shown. As is well known the air bag is comprised of a flexible material such as neoprene or rubber. A shock absorber 72 is positioned between each trailing arm 58 and each top beam 36.

A wheel support arm 74 extends upwardly and rearwardly from each trailing arm 58. An axles 76 is secured to each support arm 74 for rotatably supporting a wheel 78. The axles 76 are a conventional stub shaft which has the wheels 78 secured for rotation thereon in a conventional manner This structure places the axles 76, and therefore the wheel center can be substantially at the same level as the load floor, or above or below it, as one chooses. The level of the axles with respect to the load floor depends on the length of the trailing arms, the size of the wheels, the size of the tires, the size and angulation of the support arm 74, etc. If one chooses, axles 76 can be significantly above the load floor, depending on the ground clearance desired. One benefit of this invention is that the load floor can be made very close to the ground, whereby only a small step up or ramp up is required when the trailer is hitched to a tow vehicle. As seen in phantom line in FIG. 1, the axles 76 are well-above the trailer load floor 12 when the trailing arms 58 are pivoted about the pins 60 to the maximum upward position permitted by the suspension system 14. Thus a large portion of the wheels 78 are above the load floor 12 of the trailer 10 which contributes to the low load floor positioning of the trailer 10. It should be noted that this is achieved even though the wheels 78 are interconnected laterally of the trailer load floor 12.

The shock absorbers 72, as is well known, dampen wheel motion that occurs due to inconsistencies in the road surface. The shock absorber 72 is shown positioned between the side beam 24 and the top beam 36 such that the forces which disturb the wheel to cause the trailing arms 58 to pivot about the pin 60 will impose a tension load on the side skin 42 which interconnects the side beam 24 and the top beam 36.

It should be appreciated by those skilled in the art that the side skin 42 has good load bearing characteristics in the tension direction and is therefore a structural component of the trailer 10. However, if the side skin is not necessary, a vertical support can be added to support the load that the shock absorber 72 imposes on the top beam 36. Alternatively, the shock absorber can be mounted between the trailing arm 58 and a stanchion secured to and extending upwardly therefrom. Obviously many mounting arrangements are available for the shock absorber.

As seen in FIG. 5, the suspension system 14 permits independent action of the wheels 78. The transverse beams 64 will deflect or twist torsionally to allow this independent action. The torsion box 62 however retains the longitudinal and transverse rigidity provided by the plates 66 and the cross beams 68. It will be noted that the air springs accommodate the torsional deflection in the transverse beams 64. Thus the wheel 78 can be at independent vertical displacements relative to the load floor 12.

It should also be mentioned that the suspension system of this invention need not be limited to the particular type of tag trailer described herein, or to tag trailers in general. The suspension system of this invention is a modular suspension system that can be used on fifth wheel trailers as well. In addition, one may choose to use more than one suspension module per trailer, whether it is a tag trailer or a fifth wheel trailer. In fact, for fifth wheel trailers, it is contemplated that multiple modules would most likely be used. It is also conceivable that in some instances one may choose to use one or more suspension modules in which there are multiple axles on each support arm. In this latter instance, one might further choose to locate a forward axle on the support arm so that the wheel and tire it carries automatically becomes load bearing, or significantly load bearing, only under heavier loads.

The hitch 20 is comprised of a tube 80 which is secured to the load floor by the bracket 54 and also by a bracket 82. A conventional ball hitch housing, not shown, is welded or otherwise secured to the tube 80. The tube 80 is hermetically sealed and communicates with the air springs 70 by way of flexible tubing, not shown to provide a reservoir or accumulator for the air springs 70. Other structures or apparatus for maintaining the desired pressure level in the air springs 70 can also be employed. For example, an air pump driven by an electric motor can be mounted on the trailer 10 or the towing vehicle, not shown, as an air pressure source. The electric motor can be powered by the electrical system of the towing vehicle. With an external air source, the air springs can be deflated to lower the trailer load floor 12 to place the suspension system 14 at the phantom line position shown in FIG. 1.

The suspension can also be used in multiple wheel configurations for increased capacity in a modular approach.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed:

1. A suspension system for a trailer comprising:

a trailer load floor;

first and second trailing arms pivotally mounted outboard of said load floor on opposite sides thereof;

a torsion box including first and second transverse beam members secured between the first and second trailing arms beneath said load floor, a first plate attached to said first and second transverse beams adjacent said first trailing arm, a second plate attached to said first and second transverse beams adjacent said second trailing arm and spaced from said first plate, a first cross beam secured to said first transverse beam substantially adjacent said first plate and secured to said second transverse beam substantially adjacent said second plate, a second cross beam secured to said second transverse beam substantially adjacent said first plate and secured to said first transverse beam substantially adjacent said second plate, a first air spring compressed between said first plate and said load floor urging said load floor upward from said torsion box, a second air spring compressed between said second plate and said load floor urging said load floor upward from said torsion box, and first and second wheel support members extending upwardly of said first and second trailing arms respectfully and each support member having a wheel axis supporting a portion of a wheel above said load floor.

2. A trailer and suspension system comprising:

a trailer load floor having a plurality of transversely extending panels, said panels being interconnected in the longitudinal direction of the trailer, a pair of angle beams extending longitudinally of said load floor and being secured to respective transversely extending ends of said panels, a pair of top beams displaced from and substantially vertically aligned with said angle beams and being connected thereto by spaced fore and aft support members, and skin side panels secured between respective ones of said vertically aligned angle beams and top beams, said angle beams having a forward end;

first and second braces extending in converging relation from respective forward ends of said angle beams to a bracket secured to said load floor; and a suspension system disposed beneath said load floor comprising: a pair of trailing arms pivotally supported on respective ends of said braces outboard of said load floor and extending rearwardly relative to said load floor, a torsion box secured between said trailing arms and being disposed beneath said load floor, air spring means disposed between said torsion box and said load floor to urge separation thereof, and wheel support means extending upwardly from respective ones of said trailing arms and including an axle for supporting wheel at a rolling centerline displaced above said load floor.

3. The trailer and suspension system defined in claim 2 further comprising:

a hitch member secured with said bracket at the forward end of the load floor in a location above said braces, said hitch including a tube portion means for providing an air reservoir for said air spring means.

4. The trailer and suspension system defined in claim 2 further comprising:

said torsion box including first and second transverse beam members secured between the first and second trailing arms beneath said load floor, a first plate attached to said first and second transverse beams adjacent said first trailing arm, a second plate attached to said first and second transverse beams adjacent said second trailing arm and spaced from said first plate, a first cross beam secured to said first transverse beam substantially adjacent said first plate and secured to said second transverse beam substantially adjacent said second plate, a second cross beam secured to said second transverse beam substantially adjacent said first plate and secured to said first transverse beam substantially adjacent said second plate, a first air spring compressed between said first plate and said load floor urging said load floor upward from said torsion box, a second air spring compressed between said second plate and said load floor urging said load floor upward from said torsion box, and first and second wheel support members extending upwardly of said first and second trailing arms respectfully and each support member having a wheel axis disposed above said load floor, said torsion box providing lateral and longitudinal rigidity to said suspension system and permitting independent wheel movement by torsional displacement along said first and second transverse beams; and said air spring means being disposed between said first and second plates and an underside of said load floor.

5. The trailer and suspension system defined in claim 4 further comprising:

a hitch member secured with said bracket at the forward end of the load floor in a location above said braces, said hitch including a tube portion means for providing an air reservoir for said air spring means.

* * * * *